(12) United States Patent
Faria et al.

(10) Patent No.: US 10,072,992 B2
(45) Date of Patent: Sep. 11, 2018

(54) SYSTEM AND METHOD FOR MONITORING MACHINE CONDITION AND FORCE MEASUREMENT IN A STATOR OF AN ELECTRICAL MACHINE

(71) Applicants: Cassio Faria, Leuven (BE); Fabio Santos, Leuven (BE)

(72) Inventors: Cassio Faria, Leuven (BE); Fabio Santos, Leuven (BE)

(73) Assignee: SIEMENS INDUSTRY SOFTWARE NV, Leuven (BE)

( * ) Notice: Subject to any disclaimer, the term of this patent is extended or adjusted under 35 U.S.C. 154(b) by 80 days.

(21) Appl. No.: 14/869,965

(22) Filed: Sep. 29, 2015

(65) Prior Publication Data

US 2017/0089776 A1   Mar. 30, 2017

(51) Int. Cl.
| | | |
|---|---|---|
| *G01L 1/24* | (2006.01) | |
| *G01L 5/16* | (2006.01) | |
| *G01D 5/353* | (2006.01) | |
| *G01K 11/32* | (2006.01) | |
| *G01L 5/00* | (2006.01) | |
| *G01D 5/26* | (2006.01) | |
| *G01L 1/00* | (2006.01) | |
| *G01K 13/08* | (2006.01) | |

(52) U.S. Cl.
CPC ............. *G01L 1/246* (2013.01); *G01L 5/166* (2013.01); *G01D 5/268* (2013.01); *G01D 5/35316* (2013.01); *G01K 11/32* (2013.01); *G01K 11/3206* (2013.01); *G01K 13/08* (2013.01); *G01L 1/00* (2013.01); *G01L 1/242* (2013.01); *G01L 5/0009* (2013.01)

(58) Field of Classification Search
CPC .... G01D 5/35316; G01D 5/268; G01L 1/246; G01L 1/00; G01L 1/242; G01L 5/0009; G01K 11/32; G01K 11/3206; G01K 13/08

USPC .............................................. 73/800; 374/161
See application file for complete search history.

(56) References Cited

U.S. PATENT DOCUMENTS

| | | | | |
|---|---|---|---|---|
| 5,308,973 A * | 5/1994 | Odoni | ..................... | G01L 1/243 250/227.17 |
| 6,262,574 B1 * | 7/2001 | Cho | ........................ | B82Y 25/00 250/227.19 |
| 6,586,722 B1 * | 7/2003 | Kenny | .................... | G01L 1/246 250/227.16 |
| 6,766,697 B1 * | 7/2004 | Perez | ...................... | F16C 17/03 73/760 |

(Continued)

FOREIGN PATENT DOCUMENTS

GB    2458208 A    9/2009

OTHER PUBLICATIONS

Sarrazin et al. "NVH Analysis of a 3 phase 12/8 SR motor drive for HEV applications" EVS27 International Battery, Hybrid and Fuel Cell Electric Vehicle Symposium. Nov. 17-20, 2013. <http://ieeexplore.ieee.org/stamp/stamp.jsp?arnumber=6914767>.*

(Continued)

*Primary Examiner* — Jonathan Dunlap
(74) *Attorney, Agent, or Firm* — Lempia Summerfield Katz LLC

(57) ABSTRACT

Systems and a method for measuring at least one mechanical force in a stator of an electrical machine are provided. The stator of the electrical machine includes a multiple stacked metal lamina. At least one fiber Bragg grating (FBG) element is placed between two of the lamina, such as in a rotor-facing tooth of the lamina.

15 Claims, 4 Drawing Sheets

(56) References Cited

U.S. PATENT DOCUMENTS

| | | | |
|---|---|---|---|
| 6,888,124 B1* | 5/2005 | Smith | H02K 11/20 250/227.14 |
| 7,804,209 B2* | 9/2010 | Olkanen | G01R 31/2829 310/68 A |
| 8,092,174 B2* | 1/2012 | Egedal | F03D 17/00 416/18 |
| 8,333,551 B2* | 12/2012 | Ruggiero | F01D 25/16 415/118 |
| 8,537,364 B2* | 9/2013 | Sheth | G01N 21/47 356/446 |
| 8,700,247 B1 | 4/2014 | Wise et al. | |
| 8,780,336 B2* | 7/2014 | O'Bryan | E21B 47/0006 166/250.11 |
| 8,817,266 B2* | 8/2014 | Wilson | E21B 43/38 356/445 |
| 8,830,471 B2* | 9/2014 | Wilson | G01D 5/35316 356/32 |
| 8,891,076 B2* | 11/2014 | Sheth | G01K 11/3206 356/445 |
| 8,982,354 B2* | 3/2015 | O'Bryan | G01M 15/00 356/446 |
| 2001/0007423 A1* | 7/2001 | Cho | B82Y 25/00 324/244.1 |
| 2009/0232183 A1* | 9/2009 | Salem | G01K 11/3206 374/161 |
| 2011/0115424 A1 | 5/2011 | Vilain et al. | |
| 2012/0026482 A1 | 2/2012 | Dailey | |
| 2014/0161637 A1* | 6/2014 | O'Bryan | E21B 47/0006 417/63 |
| 2015/0280530 A1* | 10/2015 | Diatzikis | H02K 11/25 310/68 C |
| 2016/0356661 A1* | 12/2016 | Glueck | B61K 9/08 |

OTHER PUBLICATIONS

European Search Report for European Application No. 16187637.0-1557, dated Feb. 22, 2017.
European Search Report for European Application No. 16187637.0-1557, dated Jun. 9, 2017.

* cited by examiner

SYSTEM AND METHOD FOR MONITORING MACHINE CONDITION AND FORCE MEASUREMENT IN A STATOR OF AN ELECTRICAL MACHINE

TECHNICAL FIELD

The present disclosure is directed, in general, to computer aided simulation systems.

BACKGROUND

Although common electrical machines have matured, there still is a demand for improvement. Companies are pushing for automotive fleet electrification for environmental reasons (e.g., global warming) and economic reasons (e.g., higher efficiencies). Engineers in numerous technical fields, such as wind turbine generators, are faced with noisy electric motors and electric machines.

For simulation, engineering, and live operation, it is favorable to obtain a direct measurement of the forces between the rotor and the stator in an electrical machine (e.g., an electric motor). In such systems, however, the conditions are not favorable for the placement of strain gauge sensors due to electromagnetic interference. In many cases, undesired holes are drilled to create space for such resistive strain gauges, which disturbs magnetic flow. Accordingly, equipping a machine with strain gauges is not ideal because the equipping disturbs the magnetic field and results in inaccurate measurements.

While the use of piezoelectric sensors may achieve a more accurate transducer immune to electromagnetic interference, the use of piezoelectric sensors is not ideal for measuring low frequencies or direct current (DC) due to creep. Moreover, piezoelectric sensors suffer from difficult signal evaluation due to non-linearities, such as hysteresis.

Currently, there are no sufficient measurement techniques available to accurately predict noise radiated by electric motors or to address the bottleneck of the electromagnetic forces acting on a stator. As a result, simulation results are not accurate. Conventional measurement techniques of placing sensors in limited spaces generally present undesired high electromagnetic interference.

Measuring indirect quantities through simulation, such as the magnetic flux and torque in the axle to reconstruct the original force values, also are inadequate because they lack precision, particularly in newly constructed machines.

BRIEF SUMMARY

There is a need for better early-stage design and simulation that takes into account noise/vibration/harshness (NVH) aspects.

Variously disclosed embodiments include precise and minimally intrusive systems and methods for evaluating machine condition (e.g., stator force) inside a stator of an electric machine.

In some embodiments, one or more embedded fiber brag grating (FBG) optical sensors are used for directly measuring the strain inside one or each tooth, bar, or "rib" of a stator, and the forces applied to the stator are measured via the elastic properties of the steel. The use of FBG achieves numerous benefits, including, but not limited to, not needing to provide dedicated holes or the like because the FBG elements are placed in-between the lamination.

Typically, the forces result from magnetic flow that is conducted inside the lamina blades. Accordingly, the lamina is stretched or compressed in a longitude direction and not perpendicularly. Since placing of the FBG elements is tangential to the surface of the lamina blades and the FBGs respond to stretching, accurate evaluation of non-static forces in operation can be achieved. At the same time this type of sensor is immune to electromagnetic interference.

This measurement can be used for numerous purposes, including but not limited to, overload protection, monitoring the real-time operational condition of the motor, and directly deriving the motor torque. Rotor position detection is also possible indirectly with "virtual sensing"; "virtual sensing" or "soft sensing" provides that available information is used to calculate or estimate parameters that can hardly be measured directly (e.g., for technical or economical reasons). The described system and method can be used for replacement of multiple sensors, such as speed sensors, position sensors, torque sensors, vibration/noise sensors, or temperature sensors. The embodiments described herein can be deployed on all electrical machines that have a stator. Moreover, the systems and methods described herein can be used to monitor rotors that partly consist of stacked lamina. For rotor condition monitoring, it is advantageous to not only place FBG elements between rotor stack lamina but also to place the respective signal evaluation electronics in the rotor. To avoid issues with slip ring contacts, signal and power transmission to/from these electronics can be contactless. Measurements can be done at any desired operation point or working point of a machine. This provides that forces and other parameters may, inter alia, depend on rotation speed, ambient temperature, torque, and acceleration. In some embodiments, a pre-conditioning of the machine is provided to achieve the desired working point or operation point. After this, light can be applied to the FBG elements, and results can be obtained by analyzing the spectral properties of transmitted or reflected light.

In some examples, a system for measuring at least one mechanical force in a stator of an electrical machine is provided. The system includes a stator in the electrical machine. The stator includes at least two stacked metal lamina. At least one Fiber Bragg Grating (FBG) element is placed between at least two of the stacked metal lamina.

In another example, a method for evaluation mechanical force in a stator of an electrical machine is provided. The electrical machine is equipped with a system, as described before. The method includes operating the machine in a desired working point, applying light to the FBG element, comparing spectral properties of applied and received or applied and reflected light of the FBG element, calculating strain applied to the FBG element from the compared spectral properties, and calculating mechanical force in the electrical machine at the place of the FBG element by the calculated strain and by construction data or experimental data of the stator or of the electrical machine.

In a further example, a method for field-oriented control of an electrical machine is disclosed. A control unit for field oriented control utilizes at least one machine parameter of the electrical machine measured by a system or method as described before.

The forces in a stator are not constant over rotation cycle. Maxima and minima of the measured force data can therefore be used to calculate rotor position information. Such rotor position information is useful for field oriented control and for calculation of rotor speed, load factor, and other operation parameters.

The foregoing has outlined rather broadly the technical features of the present disclosure so that those skilled in the art may better understand the detailed description that follows. Additional features and advantages of the disclosure that form the subject of the claims will be described hereinafter. Those skilled in the art will appreciate that the conception and the specific embodiments disclosed may be used as a basis for modifying or designing other structures for carrying out the same purposes of the present disclosure. Those skilled in the art will also realize that such equivalent constructions do not depart from the spirit and scope of the disclosure in its broadest form.

Before undertaking the Detailed Description below, definitions of certain words or phrases that may be used throughout this patent document are set forth. For example, the terms "include" and "comprise," as well as derivatives thereof, provide inclusion without limitation. The singular forms "a", "an" and "the" are intended to include the plural forms as well, unless the context clearly indicates otherwise. Further, the term "and/or", as used herein, refers to and encompasses any and all possible combinations of one or more of the associated listed items. The term "or" is inclusive (e.g., and/or), unless the context clearly indicates otherwise. The phrases "associated with" and "associated therewith," as well as derivatives thereof, may be to include, be included within, interconnect with, contain, be contained within, connect to or with, couple to or with, be communicable with, cooperate with, interleave, juxtapose, be proximate to, be bound to or with, have, have a property of, or the like.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION

FBG elements are described at https://en.wikipedia.org/wiki/Fiber_Bragg_grating, incorporated by reference herein to the extent permitted by law. FBGs can be designed to attenuate light spectrum of transduced and/or reflected light at a specific wavelength or spectral area that directly depends on grating pitch (e.g., distance of grates). Accordingly, FBG elements of different grating pitch can be combined in one optical fiber, and each FBG will attenuate and/or reflect light in a respective spectral area. The resulting signal of the fiber chain can be evaluated for each spectral area, and the result gives information about which of the chained FBG elements is treated (stretched) by which strain. Accordingly, it is possible to daisy-chain multiple FBGs on one single light conductor (e.g., glass fiber) without losing location information if each of the FBG elements have their unique attenuation pattern on the spectrum of the transmitted or reflected light as outlined before. Multiple FBG elements can be arranged for measuring forces in different directions, regardless of whether these FBGs are chained or wired separately. For example, a set of FBGs can be arranged perpendicular to each other to achieve independent results for independent axis of a Cartesian system. Since FBG elements measure elongation, forces are calculated from FBG signal and construction data. Construction data can be based upon material and geometry data. This leads to knowledge about the correlation between force and elongation or between FBG signal and force. As an alternative, the correlation between force and elongation or between force and FBG signal response can be obtained by experiment.

As mentioned before, the output signal (e.g., the wavelength which is attenuated or reflected) depends on grating pitch, strain (e.g., elongation), and temperature. Therefore, temperature compensation in an analyzing device is important. Accordingly, a separate FBG may be used as a temperature sensor having a preferred location close to the other FBGs; alternatively, the temperature-sensing FBG may be chained with the FBGs used for force evaluation. Ideally, the temperature-sensing FBG will not be affected by changing mechanical strains.

The system can make use of dedicated analyzing hardware and software, such as light source, light probe, spectrum analyzer, a calculating unit, a communication unit, a power supply, and other devices (hereafter, collective referred to as "signal evaluation electronics"). The signal evaluation electronics can be placed inside or outside of a housing of the electrical machine, depending on available space.

Figure 1:
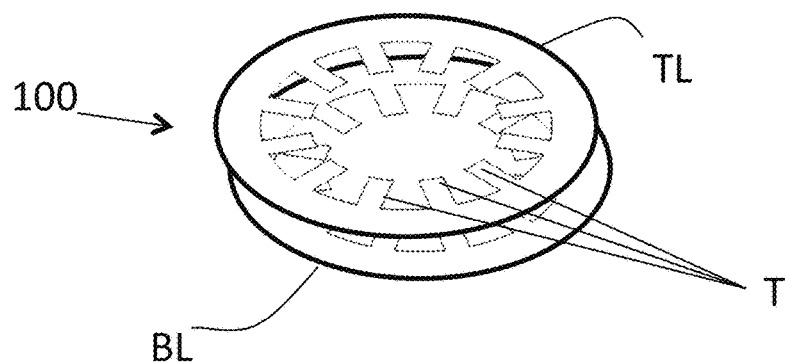
FIG. 1 illustrates as an exemplary two layer multiple lamina that can be stacked to form a stator of an electrical machine.

FIG. 1 illustrates as an exemplary two layer multiple lamina 100 that can be stacked to form a stator of an electrical machine. Bottom layer BL is layered underneath top layer TL. Typically, such stacks can consist of hundreds or thousands of single lamina (blades) that are screwed together to form a solid block.

Figure 2:
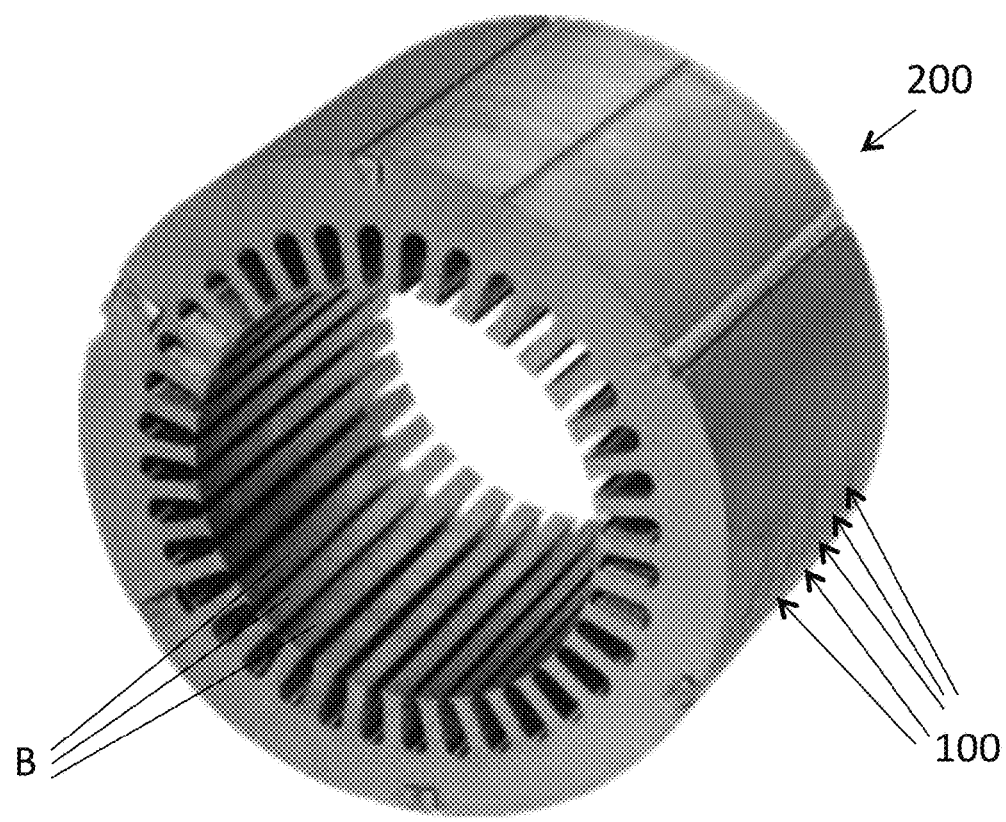
FIG. 2 illustrates an exemplary stator body including multiple stacked lamina.

FIG. 2 illustrates an exemplary stator stack body 200 (e.g., middle part of a stator) including multiple stacked lamina 100, as illustrated in FIG. 1. In this example, the blades are screwed or bolted to a solid block 200. In alternative embodiments, other methods for stacking can be employed, such as gluing. The teeth T of the stacked lamina form solid bars B ("ribs") that can later be surrounded, in the notches between the teeth, by stator coils C. The stator coils C are illustrated in the sectional view of FIG. 6. Every bar B with a corresponding coil C forms a "stator pole." Typically, each stator pole is assigned to one electrical phase of the engine. Typically, an even set of poles is assigned to each phase. Typical power engines have three electrical phases and one or more pairs of poles assigned to each phase. This provides at least six poles, and accordingly, six bars B with coils C. It is advantageous to have force or torque data of every electrical phase (e.g., for applications with field-oriented engine control), which results in at least three sets of FBG elements in a three-phase machine.

In most applications, it is advantageous to have knowledge about the forces in an air gap between rotor and stator. Such forces can be measured best in the teeth T of the stator that are facing the rotor at the air gap. Force measurement in an outer ring of the stator is possible as well, but the signal level would be lower and thus less accurate. Moreover, signal assignment to a specific motor pole or rotor position is much easier if FBGs are located close to the air gap and, accordingly, within the teeth T. The same applies to torque evaluation because torque leads to a bending of the teeth, which can be measured best within the teeth T or bars B.

Figure 3:
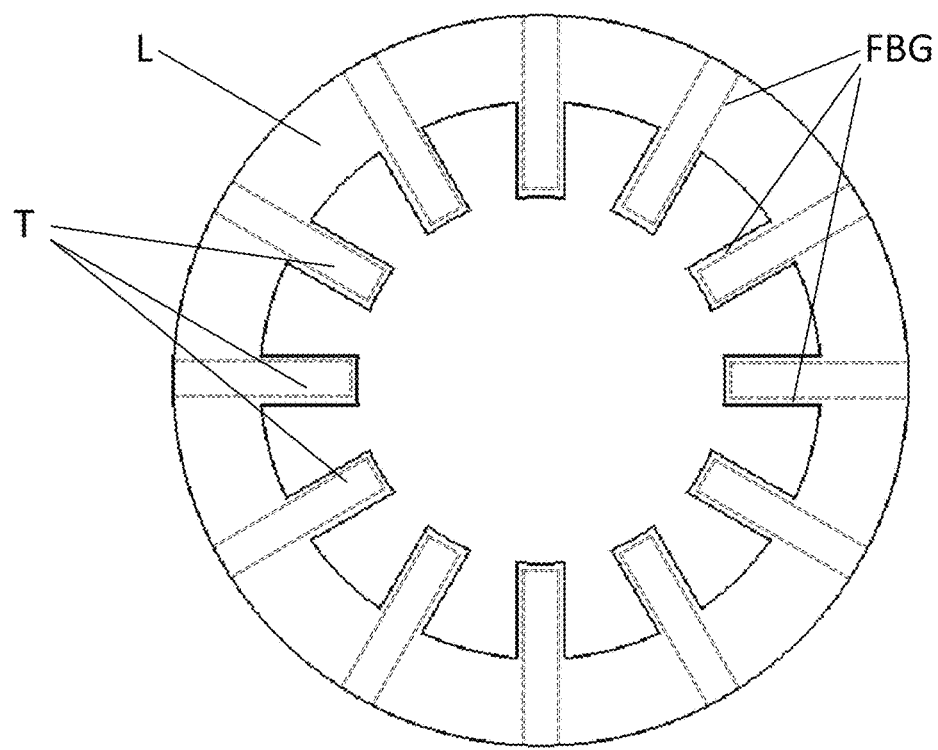
FIG. 3 illustrates an exemplary intermediate lamina (blade) with laser cuts or moldings/depressions that contain and protect FBG elements.

FIG. 3 illustrates an exemplary intermediate lamina (blade) L with laser cuts or moldings/depressions that contain and protect FBG elements. Intermediate blade L of the stator lamina is equipped with multiple FBG elements FBG. The dotted lines illustrate positions where the FBG fiber may be bonded or glued in or on the teeth T. Laser cuts or depressions on the lamina can be used to accommodate and protect the fiber. As illustrated in FIG. 3, every tooth T can be equipped with an FBG element. In other embodiments, there may be one FBG element per motor pole only. The number and position of the FBGs depend on desired information and accuracy. FBGs may also be distributed lengthwise over the stator for covering longitudinal inconstancies or torsional issues (e.g., vibration). Because of instrumentation, an intermediate blade that accommodates an FBG element can be called a "smart stator lamina".

Figure 4:
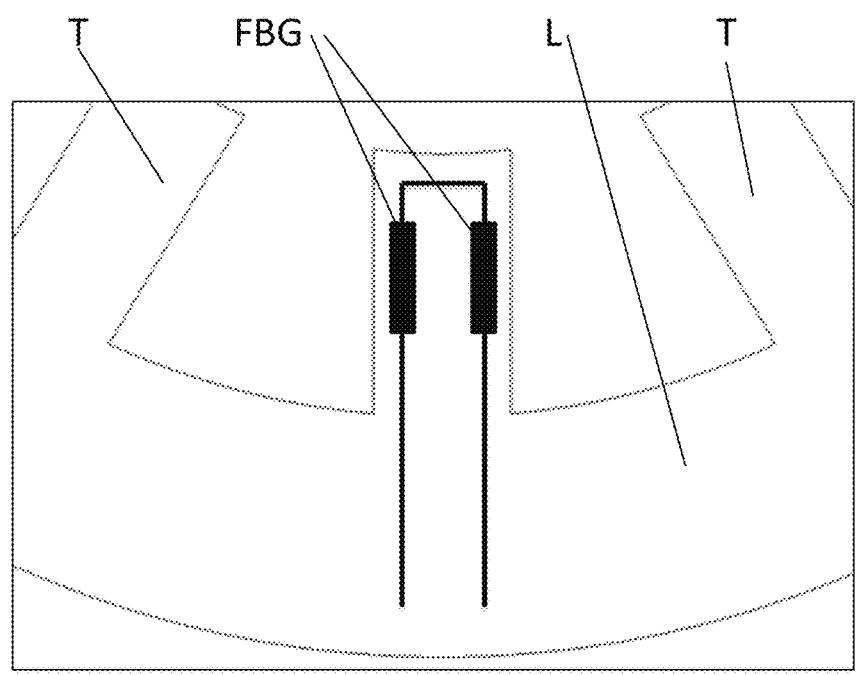
FIG. 4 illustrates placing two exemplary FBG elements in one "tooth" of a lamina for radial motor torque evaluation.
Figure 5:
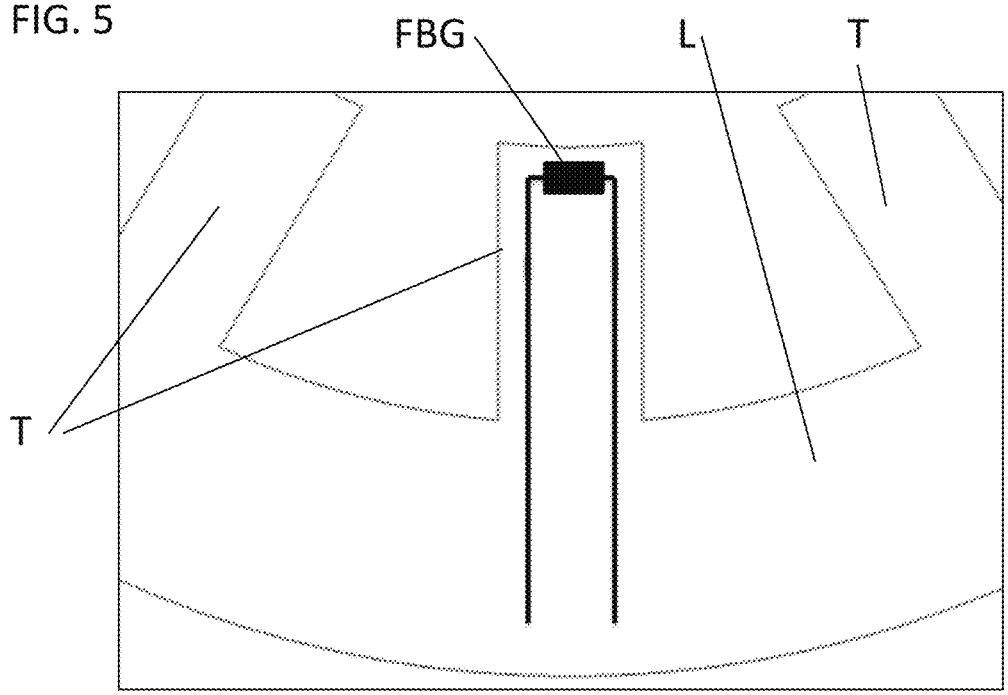
FIG. 5 illustrates placing an exemplary FBG element in one "tooth" of a lamina for stator surface force or stator temperature evaluation.
Figure 6:
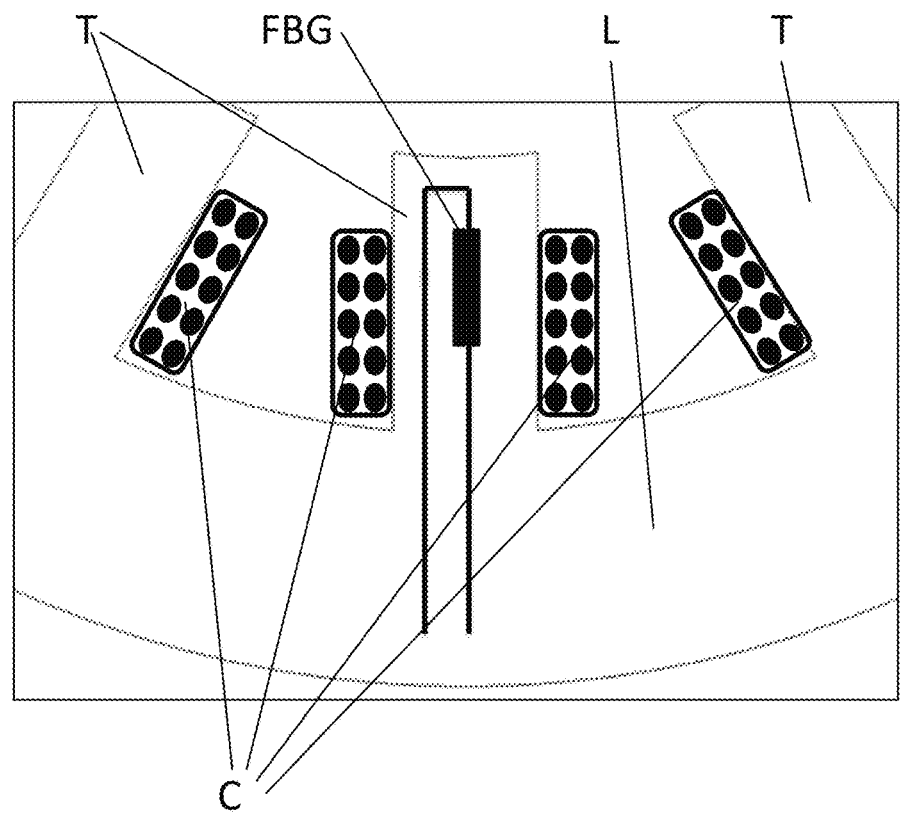
FIG. 6 illustrates an exemplary FBG position for radial force evaluation.

FIGS. 4-6 illustrate different examples for FBG alignment in a "tooth" T. Each configuration focuses on the measurement of strain in one or multiple particular directions.

FIG. 4 illustrates placing two FBG elements in one "tooth" of a lamina for motor torque evaluation. Both FBGs are radially aligned to the machine axis near both side edges of the tooth T. If tangential force caused by motor torque is applied to the bar B with the shown "tooth" T, the bar B is bended to the left or right (according to the situation outlined in FIG. 4). In this case, one FBG is elongated, and the opposite FBG is compressed.

FIG. 5 illustrates placing an FBG element in one "tooth" of a lamina for stator surface force or stator temperature evaluation. The FBG is located in a tangential direction nearby the surface of the tooth T. For example, when mounted on or near to a surface, or if not bonded or glued to a surface and thus not being stretched by mechanical forces, this FBG may be used for temperature monitoring, because the FBG responds to both strain and temperature as well. If the mounting location is free of mechanical strain or if the FBG is not connected (e.g., glued or frictionally connected) to the lamina and therefore free of mechanical strain caused by motor forces, the FBG will typically respond to temperature only. As discussed before, this applies to mounting situations where nearly no forces are expected, such as at an end of the stator body or at the very top of a tooth T, as shown in FIG. 5. Measuring data from other FBGs (e.g., FBGs in the nearby vicinity) may be temperature compensated with a temperature result achieved by the FBG shown in FIG. 5. In this respect, vicinity provides that both FBGs are faced with similar temperature conditions. That applies, for example, to mounting both FBGs in the same tooth T and/or the same lamina or the same pole.

FIG. 6 illustrates an exemplary FBG position for radial force evaluation. The FBG is aligned axially in the middle axis (e.g., neutral axis) of a tooth T. Due to the center axis location within a tooth T, the tangential forces (e.g., torque) will have no impact on the FBG element. This FBG therefore mainly responds to axial forces that can be useful for the evaluation of vibration and/or rotor position or for detection of control problems, such as DC current in a coil C. FIG. 6 also illustrates, in a sectional view, the coils C of the stator. For the sake of simplification, these are not illustrated in the other figures.

Wiring and signal evaluation electronics can be minimized by serializing or chaining (e.g., daisy-chaining) multiple FBG elements within one optical fiber (e.g., if the FBGs have different grating interval (pitch) resulting in different spectral behavior). The optical fiber (e.g., the light conductor) can be, or at least can be partly, deployed along electrical conductors of stator wiring or coils C to use the same wiring channels or holes. Because light conductors are relatively thin, in some applications, the wiring can be placed between lamina without needing separate depressions or cuts for accommodation of the wiring.

Figure 7:
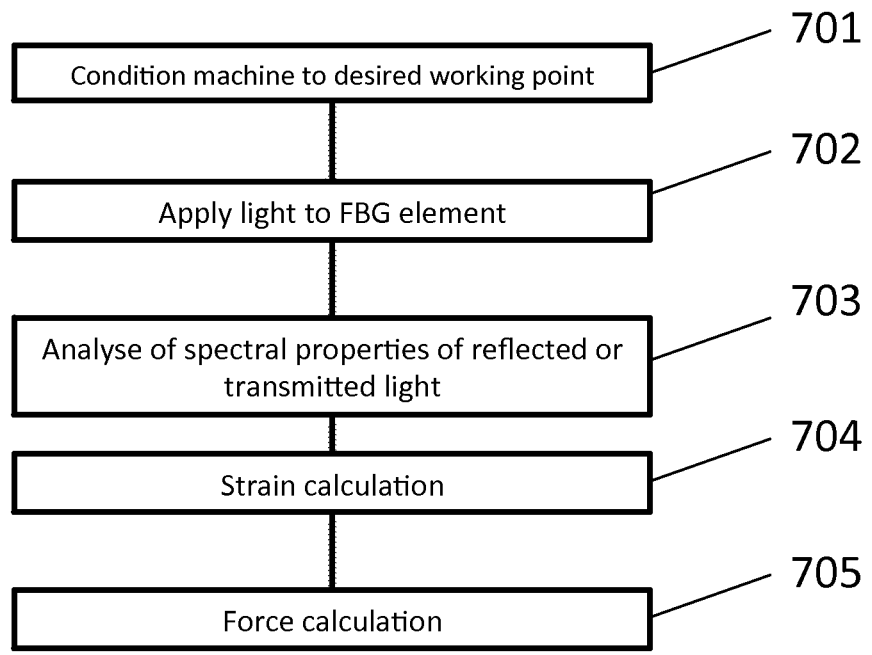
FIG. 7 illustrates a flow chart of one embodiment of a method for evaluating mechanical forces in a stator.

FIG. 7 illustrates a flow chart of one embodiment of a method for evaluating mechanical forces in a stator. In act 701, the electrical machine is conditioned for operating the machine in a desired working point. In act 702, light is applied to the FBG element. In act 703, spectral properties of (a) applied and received light of the FBG element, (b) applied and reflected light of the FBG element, or a combination thereof is measured. In act 704, strain applied to the FBG element is calculated from the compared spectral properties. In act 705, mechanical force in the electrical machine at the place of the FBG element is calculated by the calculated strain and by construction data or experimental data of the stator or of the electrical machine.

Figure 8:
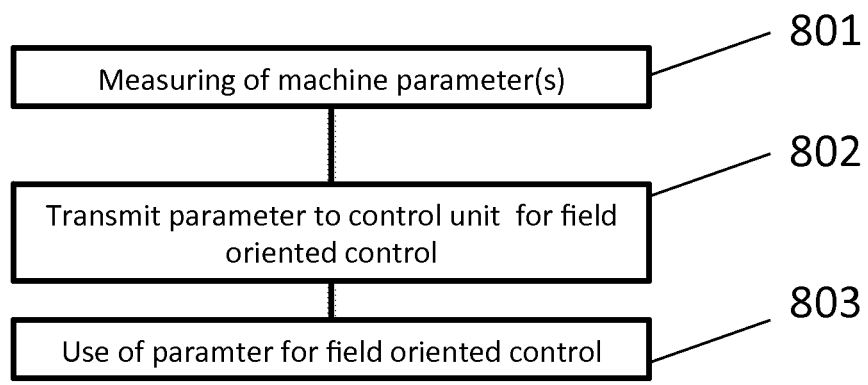
FIG. 8 illustrates a flow chart of one embodiment of a method for field oriented control of an electrical machine.

FIG. 8 illustrates a flow chart of one embodiment of a method for field oriented control of an electrical machine. The method includes, in act 801, measuring of at least one machine parameter of the electrical machine. In act 802, force data, torque data, rotor position data, or any combination thereof is transmitted from the system to the control unit for field-oriented control of the electrical machine, and in act 803, the control unit for field oriented control utilizes the transmitted data for field oriented control of the machine.

The described system and method can retrieve force and torque data that can be used for closing the loop between test and simulation in a development process. Evaluated data can help detect issues on electric motor operations and reduce maintenance costs (e.g., deterioration detection), and can improve safety (e.g., by detecting imminent failure), among other benefits. The data can replace existing sensors (e.g., rotor position, force, torque) and can be used for the control of the machine in normal operation, including field-oriented control. The use of such derived parameters is referred to as "virtual sensing". Another field of use is collecting noise, vibration and harshness (NVH) data that may be used for the optimization of machine layout and operation.

While the exemplary embodiments have been described above in detail, many changes and modifications can be made without departing from the scope of the invention. It is therefore intended that the foregoing detailed description be regarded as illustrative rather than limiting, and that the detailed description be understood that it is the following claims, including all equivalents, that are intended to define the spirit and scope of this disclosure in its broadest form.

None of the description in the present application should be read as implying that any particular element, step, act, or function is an essential element that must be included in the claim scope. The scope of patented subject matter is defined only by the allowed claims. Moreover, none of these claims are intended to invoke 35 USC § 112(f) unless the exact words "means for" are followed by a participle.

We claim:

1. A system for measuring at least one mechanical force in a stator of an electrical machine, the system comprising:
    the stator in the electrical machine, wherein the stator comprises at least two stacked metal lamina, wherein each of the at least two stacked metal lamina comprises a tooth; and
    a fiber Bragg grating (FBG) element placed between the two stacked metal lamina, the FBG element being placed on or in a surface of the tooth of one of the two stacked metal lamina, the surface being opposite a surface of the other of the two stacked metal lamina.

2. The system of claim 1, wherein the stator comprises an inner stator structure, the inner stator structure comprising a tooth, and
    wherein the FBG element is placed within the tooth.

3. The system of claim 1, wherein the FBG element is aligned to measure a radial force within the stator.

4. The system of claim 1, further comprising at least one other FBG element.

5. The system of claim 4, wherein the FBG element and the at least one other FBG element are aligned for measuring forces in different directions.

6. The system of claim 5, wherein at least two FBG elements of the FBG element and the at least one other FBG element are aligned perpendicularly.

7. The system of claim 4, wherein the electrical machine further comprises different electrical phases,
    wherein the at least two stacked metal lamina comprise multiple teeth,
    wherein the multiple teeth of the at least two stacked lamina form multiple bars, each bar of the multiple bars being assigned to one of the electrical phases, and
    wherein at least one tooth of every electrical phase is equipped with an FBG element or one set of FBG elements.

8. The system of claim 4, wherein at least two FBG elements of the FBG element and the at least one other FBG element are chained within one optical wire, the two FBG elements being distributed and aligned for covering force of multiple directions.

9. The system of claim 1, wherein the FBG element is connected to an optical wiring, and
    wherein at least one of the two stacked metal lamina, between which the FBG element or wiring of the FBG element is placed, has a cut or depression for containing the FBG element, optical wiring, or a combination thereof.

10. The system of claim 1, wherein the FBG element is bonded or glued to a surface of at least one of the two stacked metal lamina.

11. The system of claim 1, further comprising at least one other FBG element,
    wherein the FBG element and the at least one other FBG element are distributed on one common optical wire.

12. The system of claim 1, wherein the FBG element is connected to an optical wiring, and
    wherein the optical wiring is at least partly placed along an electrical wiring of a stator coil.

13. The system of claim 1, further comprising at least one temperature sensor in the vicinity of the FBG element.

14. The system of claim 1, wherein the FBG element is connected to an optical wiring, and
    wherein the optical wiring is displaced at least partly between two lamina blades.

15. The system of claim 1, wherein the FBG element is located in a rotor-facing tooth of the at least two stacked metal lamina.

* * * * *